(12) United States Patent
Wang et al.

(10) Patent No.: US 12,248,507 B2
(45) Date of Patent: Mar. 11, 2025

(54) METHOD, ELECTRONIC DEVICE, AND COMPUTER PROGRAM PRODUCT FOR CONTENT RECOMMENDATION

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/578,838

(22) Filed: Jan. 19, 2022

(65) Prior Publication Data

US 2023/0205802 A1  Jun. 29, 2023

(30) Foreign Application Priority Data

Dec. 28, 2021  (CN) .......................... 202111625650.1

(51) Int. Cl.
  *G06F 16/435* (2019.01)
  *G06F 16/2457* (2019.01)
(52) U.S. Cl.
  CPC ...... *G06F 16/435* (2019.01); *G06F 16/24578* (2019.01)
(58) Field of Classification Search
  CPC ............. G06F 16/435; G06F 16/24578; G06F 16/9535; G06F 16/335
  See application file for complete search history.

(56) References Cited

U.S. PATENT DOCUMENTS 8,301,623 B2 * 10/2012 Chakrabarti ........ G06F 16/9535
  707/723
8,301,692 B1 * 10/2012 Hamaker ........... G06Q 30/0631
  705/26.7

(Continued)

OTHER PUBLICATIONS

J. Vig, "Deconstructing BERT, Part 2: Visualizing the Inner Workings of Attention," https://towardsdatascience.com/deconstructing-bert-part-2-visualizing-the-inner-workings-of-attention-60a16d86b5c1, Jan. 7, 2019, 29 pages.

(Continued)

*Primary Examiner* — Mark E Hershley
(74) *Attorney, Agent, or Firm* — Ryan, Mason & Lewis, LLP

(57) ABSTRACT

Embodiments of the present disclosure relate to a method, an electronic device, and a computer program product for content recommendation. A method for content recommendation includes determining a similarity between a first recommendation result and a second recommendation result for a content set. The first recommendation result and the second recommendation result are determined based on different recommendation techniques and respectively indicative of a recommendation degree for each content in the content set. The method further includes adjusting the second recommendation result using the similarity. In addition, the method further includes determining a target recommendation result for the content set based on the first recommendation result and the adjusted second recommendation result. In this manner, the accuracy and stability of the finally obtained recommendation results can be improved.

20 Claims, 5 Drawing Sheets

(56) References Cited

U.S. PATENT DOCUMENTS

| | | | | |
|---|---|---|---|---|
| 10,115,146 | B1* | 10/2018 | Anderson | G06Q 30/0631 |
| 10,372,736 | B2* | 8/2019 | Li | G06F 16/319 |
| 11,070,881 | B1* | 7/2021 | Srinivasaraghavan | H04N 21/84 |
| 11,113,745 | B1* | 9/2021 | Cetintas | G06N 20/00 |
| 11,316,941 | B1* | 4/2022 | Jain | H04L 41/0816 |
| 11,416,536 | B2* | 8/2022 | Zhao | G06F 16/4387 |
| 11,935,106 | B2* | 3/2024 | Yang | G06Q 30/0627 |
| 2007/0239686 | A1* | 10/2007 | Quinn-Jacobs | G06F 16/951 |
| 2009/0248599 | A1* | 10/2009 | Hueter | G06Q 30/0631 706/15 |
| 2010/0094799 | A1* | 4/2010 | Ohashi | G06F 16/9535 706/54 |
| 2010/0100416 | A1* | 4/2010 | Herbrich | G06Q 30/0633 705/7.32 |
| 2011/0184899 | A1* | 7/2011 | Gadanho | H04N 21/26283 706/46 |
| 2012/0095863 | A1* | 4/2012 | Schiff | G06Q 30/0282 705/26.7 |
| 2013/0159331 | A1* | 6/2013 | Zhang | G06Q 30/0261 707/758 |
| 2015/0220539 | A1* | 8/2015 | Lambert | G06F 16/355 707/723 |
| 2017/0053558 | A1* | 2/2017 | Zhou | G09B 19/0092 |
| 2018/0012284 | A1* | 1/2018 | Igarashi | G06F 7/026 |
| 2018/0268253 | A1* | 9/2018 | Hoffman | G06V 10/761 |
| 2018/0276542 | A1* | 9/2018 | Cheng | G06F 16/9535 |
| 2019/0384831 | A1* | 12/2019 | Alonso | G06F 16/2237 |
| 2020/0151586 | A1* | 5/2020 | Yuan | G06N 20/00 |
| 2020/0227026 | A1* | 7/2020 | Rajagopal | G06F 16/244 |
| 2020/0251213 | A1* | 8/2020 | Tran | G06N 20/00 |
| 2020/0327599 | A1* | 10/2020 | Renaud | G06F 18/24137 |
| 2020/0402143 | A1* | 12/2020 | Gutnik | H04W 4/21 |
| 2021/0019550 | A1* | 1/2021 | Xu | G06F 16/5854 |
| 2021/0174164 | A1* | 6/2021 | Hsieh | G06Q 30/0282 |
| 2021/0241343 | A1* | 8/2021 | Arora | G06Q 30/0633 |
| 2021/0406736 | A1* | 12/2021 | Sennik | G06Q 50/22 |
| 2022/0086393 | A1* | 3/2022 | Peters | H04N 7/147 |
| 2022/0092028 | A1* | 3/2022 | Layton | G06F 16/284 |
| 2022/0108175 | A1* | 4/2022 | Lyske | G06F 40/30 |
| 2022/0129804 | A1* | 4/2022 | Dooley | G06Q 10/0635 |
| 2022/0198779 | A1* | 6/2022 | Saraee | G06F 16/9535 |
| 2022/0317979 | A1* | 10/2022 | Araujo Soares | G06F 16/9024 |
| 2023/0044463 | A1* | 2/2023 | Woolf | G06Q 30/0625 |
| 2023/0153338 | A1* | 5/2023 | Mai | G06F 16/325 707/706 |
| 2023/0205802 | A1* | 6/2023 | Wang | G06F 16/9535 707/728 |

OTHER PUBLICATIONS

E. Nalisnick et al., "Improving Document Ranking with Dual Word Embeddings," WWW'16 Companion, Apr. 2016, 2 pages.

Wikipedia, "Okapi BM25," https://en.wikipedia.org/wiki/Okapi_BM25, Feb. 24, 2021, 4 pages.

Wikipedia, "Latent Dirichlet Allocation," https://en.wikipedia.org/wiki/Latent_Dirichlet_allocation, Dec. 8, 2021, 8 pages.

G. Shperber, "A Gentle Introduction to Doc2Vec," https://medium.com/wisio/a-gentle-introduction-to-doc2vec-db3e8c0cce5e, Jul. 26, 2017, 10 pages.

H. Tian et al., "Paper2vec: Citation—Context Based Document Distributed Representation for Scholar Recommendation," arXiv:1703.06587v1, Mar. 20, 2017, 17 pages.

M. Färber et al., "HybridCite: A Hybrid Model for Context-Aware Citation Recommendation," The ACM/IEEE Joint Conference on Digital Libraries, Aug. 2020, 10 pages.

* cited by examiner

METHOD, ELECTRONIC DEVICE, AND COMPUTER PROGRAM PRODUCT FOR CONTENT RECOMMENDATION

RELATED APPLICATION(S)

The present application claims priority to Chinese Patent Application No. 202111625650.1, filed Dec. 28, 2021, and entitled "Method, Electronic Device, and Computer Program Product for Content Recommendation," which is incorporated by reference herein in its entirety.

FIELD

Embodiments of the present disclosure relate to the technical field of content recommendation and, more specifically, to a method, an electronic device, and a computer program product for content recommendation.

BACKGROUND

With the development of Internet technology, the Internet is able to provide users with more and more network services. For example, users can watch videos, listen to music, read articles, shop for goods, etc., via the Internet. Usually, users can search for content they need on Internet platforms through a search function. At the same time, in order to facilitate users' access to targeted information, Internet platforms may also actively recommend content to users. With the explosive growth of information on the Internet, content recommendation has become an important concern at present.

SUMMARY

According to an example embodiment of the present disclosure, a solution for content recommendation is provided. The solution determines a final recommendation result based on a plurality of recommendation results generated by a plurality of different recommendation techniques, and exploits, in the process of determining the final recommendation result, the correlation existing between the recommendation results by taking into consideration similarities between these recommendation results. Compared with the known conventional solutions, the solution according to embodiments of the present disclosure can strengthen the impact of several recommendation results with high similarity degrees among the plurality of recommendation results on the final recommendation result, and thus can improve the accuracy and stability of the final recommendation result, so as to enhance the quality of the final recommendation result.

In a first aspect of the present disclosure, a method for content recommendation is provided. The method includes determining a similarity between a first recommendation result and a second recommendation result for a content set. The first recommendation result and the second recommendation result are determined based on different recommendation techniques and respectively indicative of a recommendation degree for each content in the content set. The method further includes adjusting the second recommendation result using the similarity. In addition, the method further includes determining a target recommendation result for the content set based on the first recommendation result and the adjusted second recommendation result.

In a second aspect of the present disclosure, an electronic device is provided. The electronic device includes a processor and a memory coupled to the processor, the memory having instructions stored therein which, when executed by the processor, cause the device to perform actions. The actions include determining a similarity between a first recommendation result and a second recommendation result for a content set. The first recommendation result and the second recommendation result are determined based on different recommendation techniques and respectively indicative of a recommendation degree for each content in the content set. The actions further include adjusting the second recommendation result using the similarity. In addition, the actions further include determining a target recommendation result for the content set based on the first recommendation result and the adjusted second recommendation result.

In a third aspect of the present disclosure, a computer program product is provided. The computer program product is tangibly stored on a computer-readable medium and includes machine-executable instructions, wherein the machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

Figure 1:
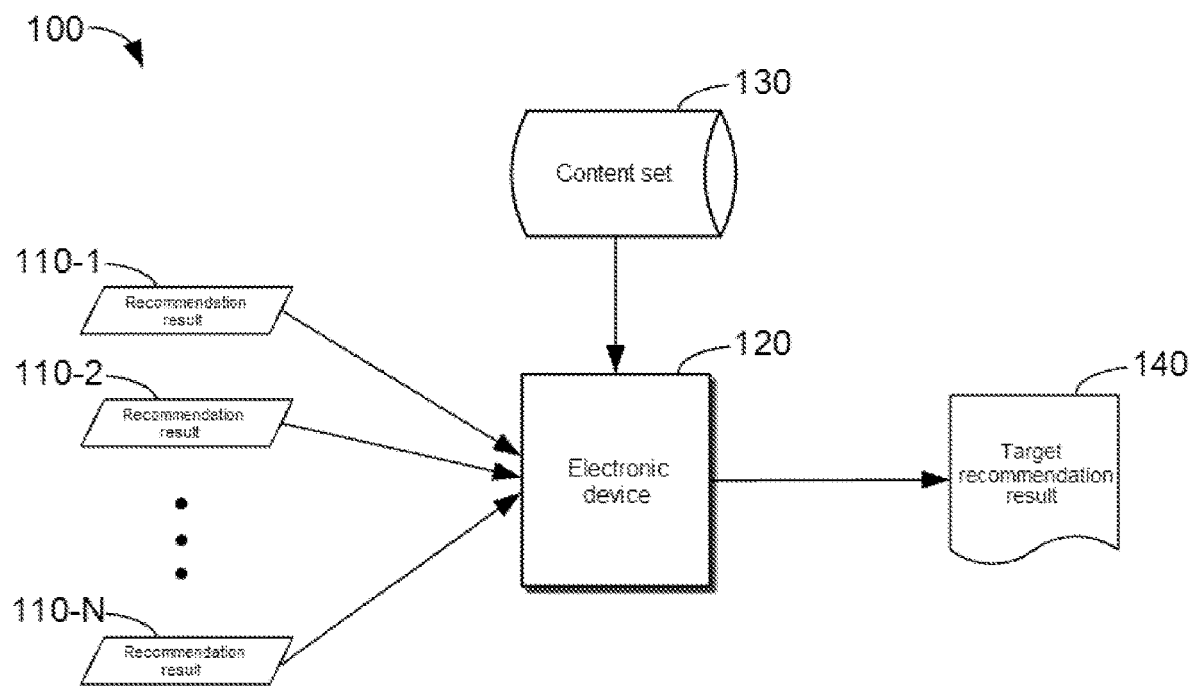
FIG. 1 illustrates a block diagram of an example environment according to some embodiments of the present disclosure.

The following will describe illustrative embodiments of the present disclosure in more detail with reference to the accompanying drawings. Although the drawings show certain embodiments of the present disclosure, it should be understood that the present disclosure can be implemented in various forms and should not be limited by the illustrative embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

As mentioned above, content recommendation has become an important concern in current Internet technology. For conventional content recommendation, recommendation results may be obtained, for example, with the help of a particular recommendation technique. However, since different conventional recommendation techniques vary in terms of accuracy, stability, and other evaluation metrics, such solutions are unable to take into account all evaluation metrics, making the quality of recommendations often mediocre.

Another known solution uses several different recommendation techniques to obtain multiple recommendation results and simply weights the multiple recommendation results to obtain a final recommendation result. Since the weighting is simply done without analyzing and exploiting the correlation existing between the recommendation results, the quality of the obtained final recommendation result may still be mediocre.

Embodiments of the present disclosure provide a solution for content recommendation. According to various embodiments of the present disclosure, by considering similarities between multiple recommendation results obtained with the aid of multiple different recommendation techniques, the multiple recommendation results are integrated to determine a final recommendation result.

As will be understood from the following description, compared with the known conventional solutions, in a process of integrating multiple recommendation results, the solution according to embodiments of the present disclosure exploits the correlation existing between the multiple recommendation results by considering similarities between these recommendation results, so as to strengthen the impact of several similar recommendation results on the final recommendation result, thus making the final recommendation result obtained more accurate and more stable.

Some example embodiments of the present disclosure will be described below with continued reference to the accompanying drawings.

FIG. 1 illustrates a block diagram of example environment 100 according to some embodiments of the present disclosure. As shown in FIG. 1, example environment 100 may generally include electronic device 120. In some embodiments, electronic device 120 may be a device with a computing capability such as a personal computer, a workstation, a server, etc. The scope of the present disclosure is not limited in this regard.

In some embodiments, electronic device 120 may acquire content set 130 as an input. The contents in content set 130 may be, for example, articles, images, music, or video. The scope of the present disclosure is not limited in this regard.

In some embodiments, electronic device 120 acquires as input first recommendation result 110-1, second recommendation result 110-2, . . . , and Nth recommendation result 110-N (individually or collectively referred to as recommendation result 110) that are determined based on a plurality of different recommendation techniques, where N is an integer greater than 1. Recommendation results 110 are respectively indicative of recommendation degrees for contents in content set 130. In the case of article recommendation, for example, a plurality of different recommendation techniques include, but are not limited to, the BM25 (Best Matching 25) algorithm, the LDA (Latent Dirichlet Allocation) algorithm, the Doc2vec algorithm, and the Paper2Vec algorithm. It should be understood that recommendation result 110 may also be determined by using any other suitable recommendation techniques, and the scope of the present disclosure is not limited in this regard.

In some embodiments, recommendation result 110 may be presented in the form of a table. One example recommendation result 110 is illustrated in Table 1 below.

TABLE 1

Example Recommendation Result

| Content number | Recommendation degree |
|---|---|
| 1 | 0.37 |
| 2 | 0.21 |
| 3 | 0.05 |
| 4 | 0.11 |
| 5 | 0.26 |

The first column of the table, "Content number," shows content numbers corresponding to the contents in content set 130, respectively, and the second column of the table, "Recommendation degree," shows recommendation degrees for the corresponding contents in numerical form. It should be understood that recommendation results 110 may also be presented in any other suitable manner, the recommendation degree may also be represented in a non-numerical form, and the scope of the present disclosure is not limited in this regard.

Electronic device 120 may integrate multiple recommendation results 110 by considering similarities between multiple recommendation results 110, so as to obtain target recommendation result 140 for content set 130. This will be described in further detail below in connection with FIGS. 2 to 4.

Figure 2:
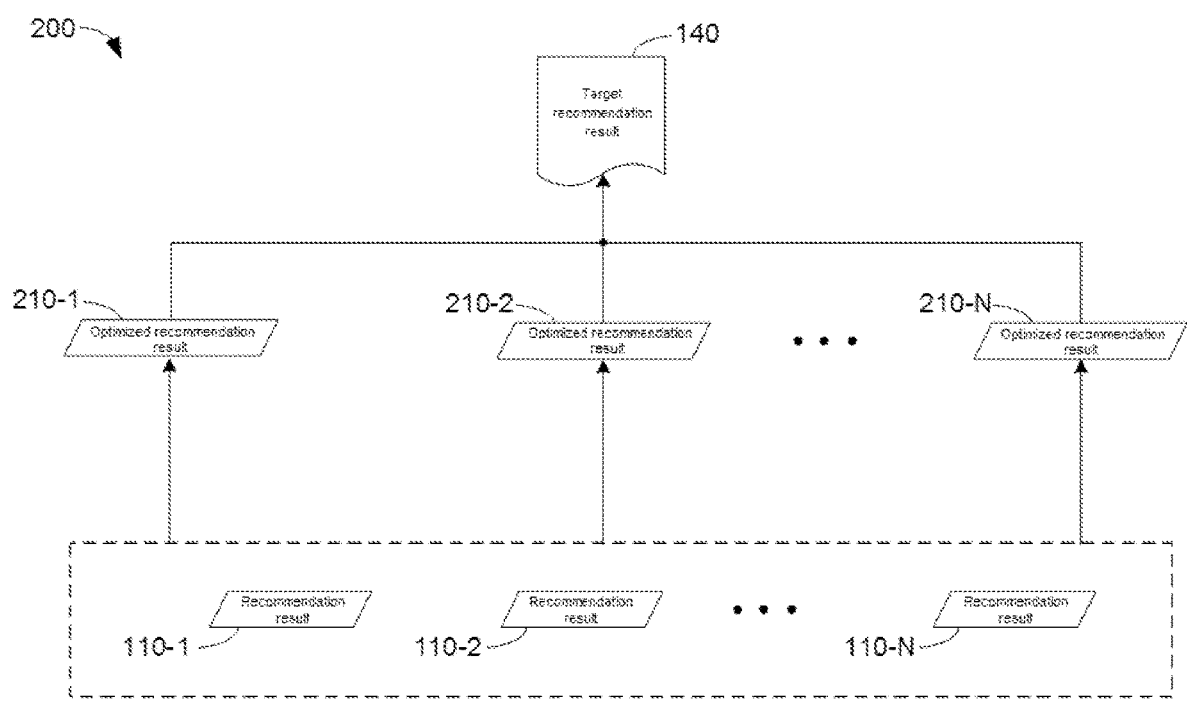
FIG. 2 illustrates a schematic diagram of a process for determining a target recommendation result according to some embodiments of the present disclosure.

FIG. 2 illustrates a schematic diagram of process 200 for determining target recommendation result 140 according to some embodiments of the present disclosure. As shown in FIG. 2, electronic device 120 may generate first optimized recommendation result 210-1, second optimized recommendation result 210-2, . . . , and Nth optimized recommendation result 210-N (individually or collectively referred to as optimized recommendation result 210) based on multiple recommendation results 110, and determine target recommendation result 140 based on optimized recommendation results 210.

In some embodiments, electronic device 120 may determine optimized recommendation results 210 by considering similarities between multiple recommendation results 110. This will be described in further detail below in conjunction with FIG. 3.

In some embodiments, for example, in the case where recommendation results 110 are presented in the table form as described above, electronic device 120 may obtain target recommendation result 140 by directly summing the recommendation degrees for the contents in optimized recommendation results 210 determined based on recommendation results 110. It should be understood that, depending on the form of the recommendation results, any other suitable technique may also be employed to obtain target recommendation result 140 from optimized recommendation results 210, and the scope of the present disclosure is not limited in this regard.

In some embodiments, content set 130 may be a set of candidate articles, and the various recommendation techniques described above may recommend a candidate article from the set of candidate articles based on a predetermined base article (not shown). This base article may, for example, be pre-specified by a user. In such case, electronic device 120 may additionally determine a set of correlation measures associated with the set of candidate articles. Each correlation measure in the set of correlation measures indicates the correlation degree between the corresponding candidate article and the base article.

In some embodiments, for each candidate article in the set of candidate articles, electronic device 120 may use a pre-trained language model to determine the correlation degree between a reference of the candidate article and the title of the base article to serve as the correlation measure associated with that candidate article. The language model includes, but is not limited to, a Bidirectional Encoder Representations from Transformers (BERT) model, a Generative Pre-Training (GPT) model, a Word2vec model, etc.

The inventors have found that the reference of an article often includes one or more articles that the author of the article considers to have relatively high correlation degrees with his or her article, so the correlation degree between a reference of a candidate article and the title of the base article that is determined using the language model can more accurately reflect the correlation between the candidate article and the base article. Thus, by adjusting target recommendation result 140 using such a correlation measure, the accuracy of the final recommendation result can be improved, thereby further enhancing the quality of the final recommendation result.

It should be understood that the correlation degree between a candidate article and the base article may also be determined in any other suitable manner, and the scope of the present disclosure is not limited in this regard.

In some embodiments, for a plurality of references included in a candidate article, electronic device 120 may use a pre-trained language model to determine the correlation between the title of each reference and the title of the base article to serve as the correlation between that reference and the base article. Electronic device 120 may calculate an average of the correlations between all of the references included in a candidate article and the base article to serve as a correlation measure associated with that candidate article.

Electronic device 120 may adjust target recommendation result 140 using the determined set of correlation measures, so as to update target recommendation result 140. In some embodiments, for each candidate article in the set of candidate articles, electronic device 120 may take the product of a correlation measure associated with that candidate article and the recommendation degree of that candidate article in target recommendation result 140 to serve as the updated recommendation degree of that candidate article.

In this way, electronic device 120 may fine tune obtained target recommendation result 140 by additionally considering correlation degrees between candidate articles and the base article, so as to further enhance the quality of the final recommendation result.

Figure 3:
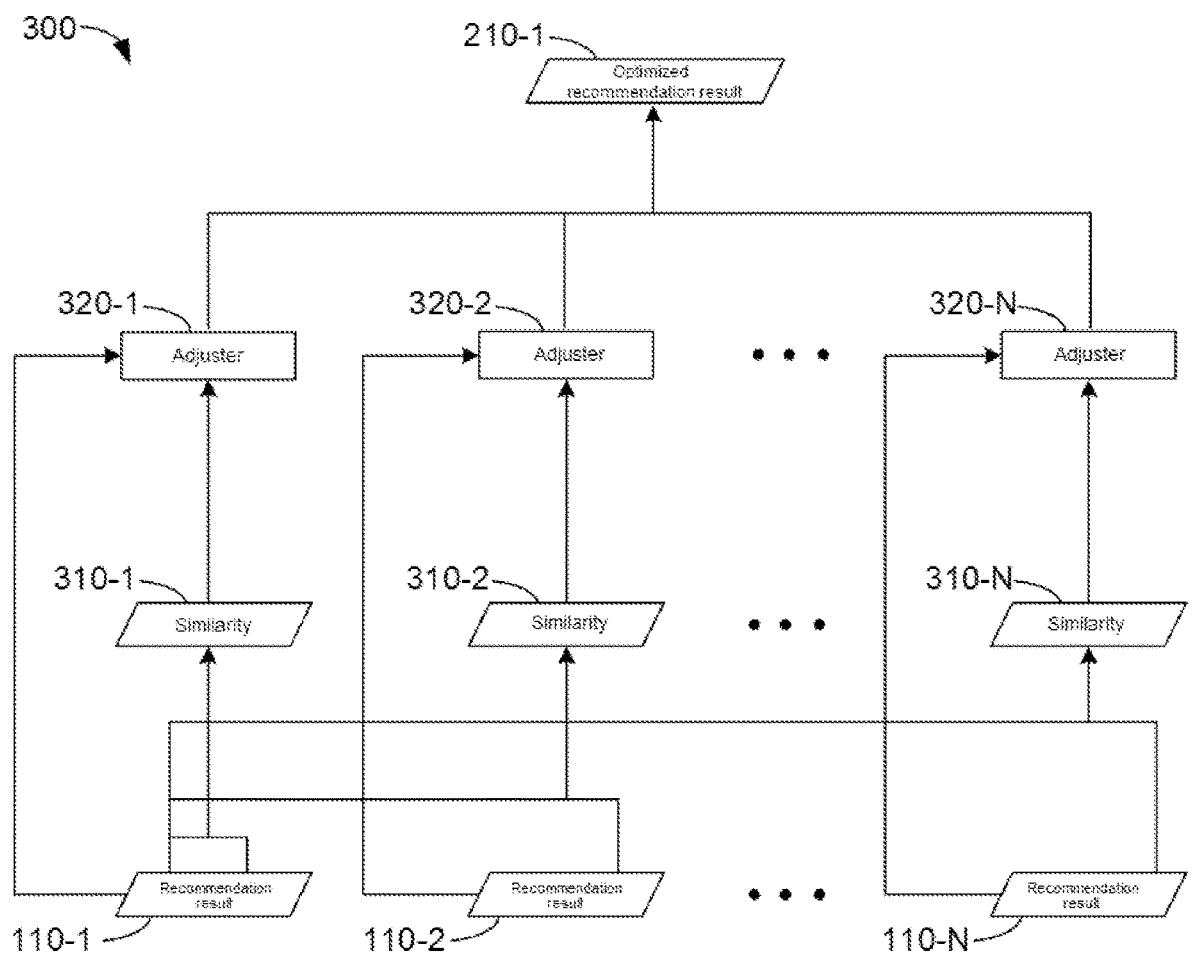
FIG. 3 illustrates a schematic diagram of a process for determining a first optimized recommendation result according to some embodiments of the present disclosure.

FIG. 3 illustrates a schematic diagram of process 300 for determining first optimized recommendation result 210-1 according to some embodiments of the present disclosure. As shown in FIG. 3, electronic device 120 may determine a set of similarities 310-1 to 310-N (individually or collectively referred to as similarities 310) associated with first recommendation result 110-1 based on recommendation results 110. Similarity 310 may indicate a similarity degree between two different recommendation results 110. For example, similarity 310-2 indicates the similarity degree between first recommendation result 110-1 and second recommendation result 110-2, and similarity 310-N indicates the similarity degree between first recommendation result 110-1 and the Nth recommendation result 110-N. It should be noted that in the context of the present disclosure, similarity 310 may also include a similarity degree between one recommendation result 110 and itself. For example, similarity 310-1 indicates the similarity degree between first recommendation result 110-1 and itself.

In the description below, the determination of similarity 310-2 between first recommendation result 110-1 and second recommendation result 110-2 will be taken as an example for description. In some embodiments, electronic device 120 may determine a first set of indications based on first recommendation result 110-1, the first set of indications being respectively indicative of recommendation degrees for corresponding contents in content set 130. The first set of indications may be embodied, for example, in the form of a vector composed of recommendation degrees. As an example, a set of indications for the recommendation results shown in Table 1 above may be a vector [0.37, 0.21, 0.05, 0.11, 0.26]. Similarly, electronic device 120 may determine a second set of indications based on second recommendation result 110-2, the second set of indications being respectively indicative of recommendation degrees for corresponding contents in content set 130. Electronic device 120 may then determine a cosine similarity between the first set of indications and the second set of indications to serve as similarity 310-2 between first recommendation result 110-1 and second recommendation result 110-2.

In this way, compared with conventional simple weighting technical solutions, the solution according to embodiments of the present disclosure can analyze and mine the correlation between various recommendation results, so that it is possible to strengthen the proportion of multiple recommendation results with high similarities 310 in the final recommendation result, and also take into account recommendation results with relatively low similarities 310, thereby improving the accuracy and stability of the final recommendation result.

It should be understood that depending on the specific form of the first set of indications and the second set of indications, similarity 310 between two recommendation results 110 may also be determined with the aid of any other suitable similarity measure method such as Euclidean distance, Hamming distance, etc., and the scope of the present disclosure is not limited in this regard.

Electronic device 120 may determine the remaining similarities 310 in a manner similar to that described above with reference to similarity 310-2. It will not be repeated here in the present disclosure.

As shown in FIG. 3, electronic device 120 may adjust corresponding recommendation results 110 based on determined similarities 310 with the aid of adjusters 320-1 to 320-N (individually or collectively referred to as adjuster 320), so as to obtain adjusted recommendation results. In some embodiments, electronic device 120 may determine a scaling factor based on similarity 310 and adjust recommendation result 110 using the scaling factor. As an example, electronic device 120 may directly determine the value of the cosine similarity described above as the scaling factor and calculate the product of recommendation result 110 and this scaling factor as the adjusted recommendation result. It should be understood that electronic device 120 may also adjust recommendation result 110 based on similarity 310 in any other suitable manner, such as determining the scaling factor based on similarity 310 by using a mapping table indicating the mapping relationship between similarities 310 and scaling factors, and the scope of the present disclosure is not limited in this regard. By means of this adjustment manner, the method according to embodiments of the present disclosure can use the similarity to adjust the impact of each recommendation result 110 on the finally obtained recommendation result, so that it is possible to strengthen the proportion of several recommendation results with high similarities 310 in the final recommendation result, and also take into account recommendation results with relatively low similarities 310. Thus, the accuracy and stability of the final recommendation result can be improved.

In some embodiments, since the cosine similarity between one recommendation result 110 and itself is always 1, it is also possible to no longer calculate similarity 310-1 for first recommendation result 110-1 and to eliminate adjuster 320-1, thereby saving the computing power of electronic device 120.

As shown in FIG. 3, electronic device 120 may determine first optimized recommendation result 210-1 corresponding to first recommendation result 110-1 based on the adjusted recommendation result output by adjuster 320-1. In some embodiments, electronic device 120 may directly sum the adjusted recommendation results to obtain first optimized recommendation result 210-1. It should be understood that optimized recommendation result 210 may also be obtained based on the adjusted recommendation result in any other suitable manner, and the scope of the present disclosure is not limited in this regard. By means of this adjustment manner, the method according to embodiments of the present disclosure may use the similarity to adjust each recommendation result 110, so that target recommendation result 140 obtained based on optimized recommendation result 210 may reflect, to a greater extent, recommendation results with high similarities, but may also take into account recommendation results with relatively low similarities, thereby improving the accuracy and stability of the final recommendation result.

Electronic device 120 may determine optimized recommendation result 210 corresponding to the remaining recommendation result 110 in a similar manner to the determination of first optimized recommendation result 210-1. For example, electronic device 120 may determine similarities 310 between second recommendation result 110-2 and recommendation results 110 and use determined similarities 310 to adjust recommendation results 110 to obtain second optimized recommendation result 210-2. It will not be repeated here in the present disclosure.

Figure 4:
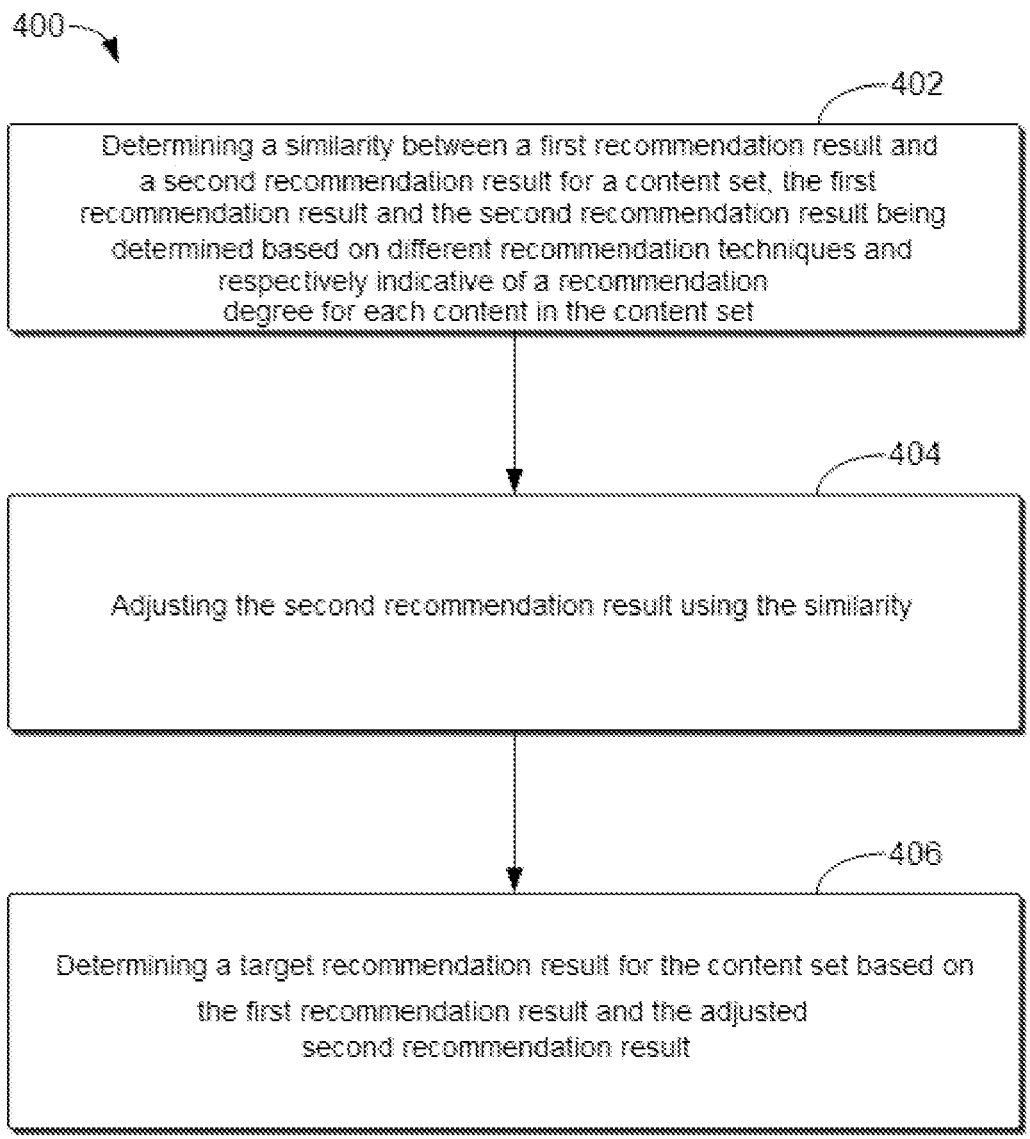
FIG. 4 illustrates a flow chart of a method for content recommendation according to some embodiments of the present disclosure.

FIG. 4 illustrates a flow chart of method 400 for content recommendation according to some embodiments of the present disclosure. For example, method 400 may be executed by electronic device 120 as shown in FIG. 1. It should be understood that method 400 may also include additional blocks not shown and/or the blocks shown may be omitted. The scope of the present disclosure is not limited in this regard. For ease of description, method 400 will be described below with reference to FIGS. 1 to 3.

At block 402, electronic device 120 determines similarity 310-1 between first recommendation result 110-1 and second recommendation result 110-2 for content set 130, first recommendation result 110-1 and second recommendation result 110-2 being determined based on different recommendation techniques and respectively indicative of a recommendation degree for each content in content set 130.

In some embodiments, determining similarity 310-1 includes: determining a first set of indications based on first recommendation result 110-1, the first set of indications being respectively indicative of recommendation degrees for corresponding contents in content set 130; determining a second set of indications based on second recommendation result 110-2, the second set of indications being respectively indicative of recommendation degrees for corresponding contents in content set 130; and determining a cosine similarity between the first set of indications and the second set of indications.

At block 404, electronic device 120 adjusts second recommendation result 110-2 using similarity 310-2. In some embodiments, adjusting second recommendation result 110-2 includes: determining a scaling factor based on similarity 310-2; and scaling second recommendation result 110-2 using the scaling factor.

At block 406, electronic device 120 determines target recommendation result 140 for content set 130 based on first recommendation result 110-1 and the adjusted second recommendation result. In some embodiments, determining target recommendation result 140 includes: acquiring first optimized recommendation result 210-1 corresponding to first recommendation result 110-1 using first recommendation result 110-1 and the adjusted second recommendation result; and determining target recommendation result 140 based on first optimized recommendation result 210-1.

In some embodiments, determining target recommendation result 140 based on first optimized recommendation result 210-1 includes: adjusting first recommendation result 110-1 using similarity 310-1; acquiring, using second recommendation result 110-2 and the adjusted first recommendation result, second optimized recommendation result 210-2 corresponding to second recommendation result 110-2; and determining target recommendation result 140 based on first optimized recommendation result 210-1 and second optimized recommendation result 210-2.

In some embodiments, content set 130 is a set of candidate articles and the recommendation technique recommends a candidate article from the set of candidate articles based on a predetermined base article, and method 400 further includes: determining a set of correlation measures associated with the set of candidate articles, each correlation measure in the set of correlation measures being indicative of a correlation degree between a corresponding candidate article and the base article; and adjusting target recommendation result 140 using the set of correlation measures, so as to update target recommendation result 140.

In some embodiments, the set of candidate articles comprises a first candidate article, the set of correlation measures comprises a first correlation measure corresponding to the first candidate article, and determining the set of correlation measures comprises: determining, using a pre-trained language model, a correlation degree between a reference of the first candidate article and a title of the base article to serve as the first correlation measure.

As can be seen from the above description in conjunction with FIGS. 1 to 4, in the process of integrating multiple recommendation results to obtain a final recommendation result, the method for content recommendation according to embodiments of the present disclosure can exploit the correlation existing between the multiple recommendation results by considering similarities between these recommendation results, so as to strengthen the impact of several similar recommendation results on the final recommendation result. Therefore, compared with the known conventional solutions, the method according to embodiments of the present disclosure can strengthen the proportion of several recommendation results with high similarities among multiple recommendation results in the final recommendation result, and thus can improve the accuracy and stability of the final recommendation result, so as to enhance the quality of the final recommendation result.

Figure 5:
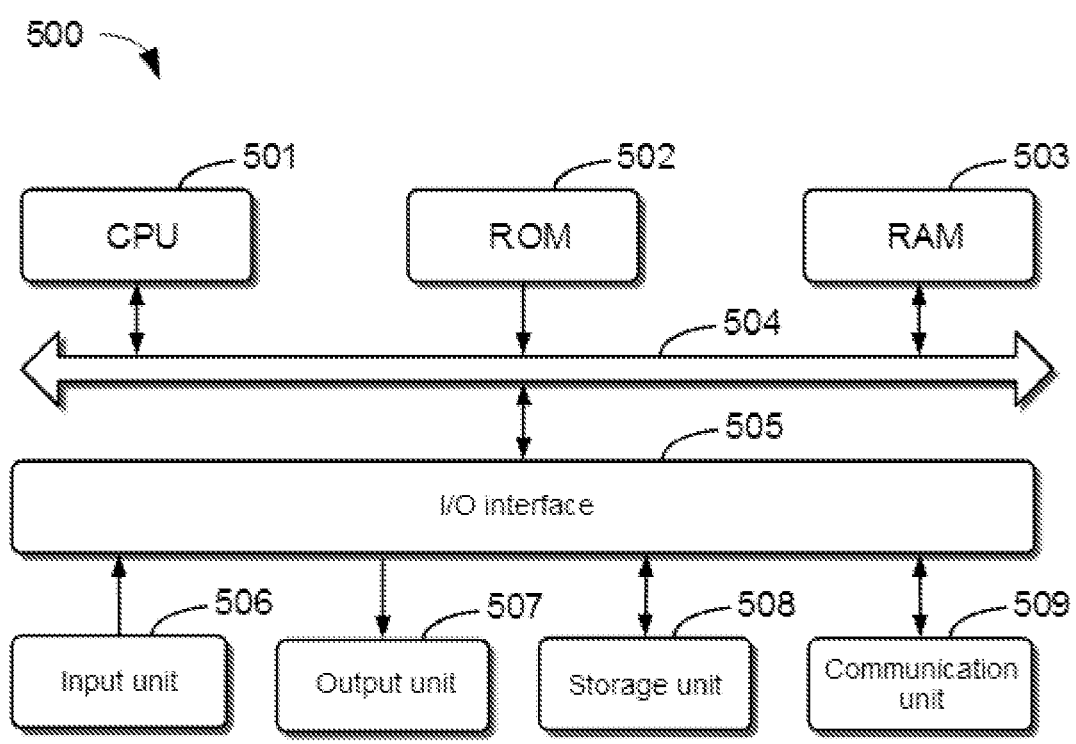
FIG. 5 illustrates a schematic block diagram of an example device that may be used to implement some embodiments of the present disclosure.

FIG. 5 illustrates a schematic block diagram of example device 500 that may be used to implement some embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Various processes and processing described above, for example, method 400, may be performed by CPU 501. For example, in some embodiments, method 400 may be implemented as a computer software program that is tangibly included in a machine-readable medium, such as storage unit 508. In some embodiments, part of or all the computer program may be loaded and/or installed to device 500 via ROM 502 and/or communication unit 509. When the computer programs are loaded to RAM 503 and executed by CPU 501, one or more actions in method 400 described above can be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed here.

What is claimed is:

1. A method for content recommendation, comprising:
   determining, in at least one processing device of an Internet platform, a similarity between a first recommendation result and a second recommendation result for a content set, the first recommendation result and the second recommendation result being determined based on different recommendation techniques and respectively indicative of a recommendation degree for each of a plurality of content items in the content set, wherein the similarity is computed in the form of at least one vector of values indexed by identifiers of respective ones of the content items in the content set;
   adjusting, in the at least one processing device of the Internet platform, the second recommendation result using the similarity;
   determining, in the at least one processing device of the Internet platform, a target recommendation result for the content set based on the first recommendation result and the adjusted second recommendation result;
   providing the target recommendation result from the at least one processing device of the Internet platform to a user device over a network; and
   responsive to user interaction with a display presenting the target recommendation result at the user device, providing access to corresponding content at least in part via the at least one processing device of the Internet platform;
   wherein determining the similarity between the first and second recommendation results comprises:
   determining a first vector comprising a first set of indications based on the first recommendation result, the first vector being indexed by the identifiers of respective ones of the content items in the content set;
   determining a second vector comprising a second set of indications based on the second recommendation result, the second vector being indexed by the identifiers of respective ones of the content items in the content set; and
   determining the similarity based at least in part on a distance measure computed between the first and second vectors;
   wherein adjusting the second recommendation result using the similarity comprises:
   determining a modification factor based on the similarity; and
   adjusting the second recommendation result based on the modification factor to alter an impact of the second recommendation result in determining the target recommendation result;
   wherein adjusting the second recommendation result based on the modification factor comprises computing updated values for respective ones of the second set of indications of the second vector as a function of previous values for the respective ones of the second set of indications and the modification factor.

2. The method according to claim 1, wherein determining the similarity comprises:
   determining the first vector as the first set of indications based on the first recommendation result, the first set of indications being respectively indicative of recommendation degrees for corresponding contents in the content set;
   determining the second vector as the second set of indications based on the second recommendation result, the second set of indications being respectively indicative of recommendation degrees for corresponding contents in the content set; and
   determining the distance measure between the first and second vectors at least in part by computing a cosine similarity between the first set of indications and the second set of indications.

3. The method according to claim 1, wherein adjusting the second recommendation result comprises:
   determining a scaling factor based on the similarity; and
   scaling the second recommendation result using the scaling factor.

4. The method according to claim 1, wherein determining the target recommendation result comprises:

acquiring a first optimized recommendation result corresponding to the first recommendation result using the first recommendation result and the adjusted second recommendation result; and determining the target recommendation result based on the first optimized recommendation result.

5. The method according to claim 4, wherein determining the target recommendation result based on the first optimized recommendation result comprises:

adjusting the first recommendation result using the similarity;

acquiring a second optimized recommendation result corresponding to the second recommendation result using the second recommendation result and the adjusted first recommendation result; and determining the target recommendation result based on the first optimized recommendation result and the second optimized recommendation result.

6. The method according to claim 1, wherein the content set is a set of candidate articles and the recommendation technique recommends a candidate article from the set of candidate articles based on a predetermined base article, and the method further comprises:

determining a set of correlation measures associated with the set of candidate articles, each correlation measure in the set of correlation measures being indicative of a correlation degree between a corresponding candidate article and the base article; and adjusting the target recommendation result using the set of correlation measures, so as to update the target recommendation result.

7. The method according to claim 6, wherein the set of candidate articles comprises a first candidate article, the set of correlation measures comprises a first correlation measure corresponding to the first candidate article, and determining the set of correlation measures comprises:

determining, using a pre-trained language model, a correlation degree between a reference of the first candidate article and a title of the base article to serve as the first correlation measure.

8. An electronic device of an Internet platform, the electronic device comprising:

a processor; and a memory coupled to the processor, wherein the memory has instructions stored therein, and the instructions, when executed by the processor, cause the electronic device to execute actions comprising:

determining a similarity between a first recommendation result and a second recommendation result for a content set, the first recommendation result and the second recommendation result being determined based on different recommendation techniques and respectively indicative of a recommendation degree for each of a plurality of content items in the content set, wherein the similarity is computed in the form of at least one vector of values indexed by identifiers of respective ones of the content items in the content set;

adjusting the second recommendation result using the similarity;

determining a target recommendation result for the content set based on the first recommendation result and the adjusted second recommendation result;

providing the target recommendation result from the Internet platform to a user device over a network; and responsive to user interaction with a display presenting the target recommendation result at the user device, providing access to corresponding content at least in part via the Internet platform;

wherein determining the similarity between the first and second recommendation results comprises:

determining a first vector comprising a first set of indications based on the first recommendation result, the first vector being indexed by the identifiers of respective ones of the content items in the content set;

determining a second vector comprising a second set of indications based on the second recommendation result, the second vector being indexed by the identifiers of respective ones of the content items in the content set; and determining the similarity based at least in part on a distance measure computed between the first and second vectors;

wherein adjusting the second recommendation result using the similarity comprises:

determining a modification factor based on the similarity; and adjusting the second recommendation result based on the modification factor to alter an impact of the second recommendation result in determining the target recommendation result;

wherein adjusting the second recommendation result based on the modification factor comprises computing updated values for respective ones of the second set of indications of the second vector as a function of previous values for the respective ones of the second set of indications and the modification factor.

9. The electronic device according to claim 8, wherein determining the similarity comprises:

determining the first vector as the first set of indications based on the first recommendation result, the first set of indications being respectively indicative of recommendation degrees for corresponding contents in the content set;

determining the second vector as the second set of indications based on the second recommendation result, the second set of indications being respectively indicative of recommendation degrees for corresponding contents in the content set; and determining the distance measure between the first and second vectors at least in part by computing a cosine similarity between the first set of indications and the second set of indications.

10. The electronic device according to claim 8, wherein adjusting the second recommendation result comprises:

determining a scaling factor based on the similarity; and scaling the second recommendation result using the scaling factor.

11. The electronic device according to claim 8, wherein determining the target recommendation result comprises:

acquiring a first optimized recommendation result corresponding to the first recommendation result using the first recommendation result and the adjusted second recommendation result; and determining the target recommendation result based on the first optimized recommendation result.

12. The electronic device according to claim 11, wherein determining the target recommendation result based on the first optimized recommendation result comprises:

adjusting the first recommendation result using the similarity;

acquiring a second optimized recommendation result corresponding to the second recommendation result using the second recommendation result and the adjusted first recommendation result; and determining the target recommendation result based on the first optimized recommendation result and the second optimized recommendation result.

13. The electronic device according to claim 8, wherein the content set is a set of candidate articles, the recommendation technique recommends a candidate article from the set of candidate articles based on a predetermined base article, and the actions further comprise:

determining a set of correlation measures associated with the set of candidate articles, each correlation measure in the set of correlation measures being indicative of a correlation degree between a corresponding candidate article and the base article; and adjusting the target recommendation result using the set of correlation measures, so as to update the target recommendation result.

14. The electronic device according to claim 13, wherein the set of candidate articles comprises a first candidate article, the set of correlation measures comprises a first correlation measure corresponding to the first candidate article, and determining the set of correlation measures comprises:

determining, using a pre-trained language model, a correlation degree between a reference of the first candidate article and a title of the base article to serve as the first correlation measure.

15. A computer program product tangibly stored on a computer-readable medium and comprising machine-executable instructions, wherein the machine-executable instructions, when executed by at least one processing device of an Internet platform, cause the at least one processing device of the Internet platform to perform a method for content recommendation, the method comprising:

determining a similarity between a first recommendation result and a second recommendation result for a content set, the first recommendation result and the second recommendation result being determined based on different recommendation techniques and respectively indicative of a recommendation degree for each of a plurality of content items in the content set, wherein the similarity is computed in the form of at least one vector of values indexed by identifiers of respective ones of the content items in the content set;

adjusting the second recommendation result using the similarity;

determining a target recommendation result for the content set based on the first recommendation result and the adjusted second recommendation result;

providing the target recommendation result from the at least one processing device of the Internet platform to a user device over a network; and responsive to user interaction with a display presenting the target recommendation result at the user device, providing access to corresponding content at least in part via the at least one processing device of the Internet platform;

wherein determining the similarity between the first and second recommendation results comprises:

determining a first vector comprising a first set of indications based on the first recommendation result, the first vector being indexed by the identifiers of respective ones of the content items in the content set;

determining a second vector comprising a second set of indications based on the second recommendation result, the second vector being indexed by the identifiers of respective ones of the content items in the content set; and determining the similarity based at least in part on a distance measure computed between the first and second vectors;

wherein adjusting the second recommendation result using the similarity comprises:

determining a modification factor based on the similarity; and adjusting the second recommendation result based on the modification factor to alter an impact of the second recommendation result in determining the target recommendation result;

wherein adjusting the second recommendation result based on the modification factor comprises computing updated values for respective ones of the second set of indications of the second vector as a function of previous values for the respective ones of the second set of indications and the modification factor.

16. The computer program product according to claim 15, wherein determining the similarity comprises:

determining the first vector as the first set of indications based on the first recommendation result, the first set of indications being respectively indicative of recommendation degrees for corresponding contents in the content set;

determining the second vector as the second set of indications based on the second recommendation result, the second set of indications being respectively indicative of recommendation degrees for corresponding contents in the content set; and determining the distance measure between the first and second vectors at least in part by computing a cosine similarity between the first set of indications and the second set of indications.

17. The computer program product according to claim 15, wherein adjusting the second recommendation result comprises:

determining a scaling factor based on the similarity; and scaling the second recommendation result using the scaling factor.

18. The computer program product according to claim 15, wherein determining the target recommendation result comprises:

acquiring a first optimized recommendation result corresponding to the first recommendation result using the first recommendation result and the adjusted second recommendation result; and determining the target recommendation result based on the first optimized recommendation result.

19. The computer program product according to claim 18, wherein determining the target recommendation result based on the first optimized recommendation result comprises:

adjusting the first recommendation result using the similarity;

acquiring a second optimized recommendation result corresponding to the second recommendation result using the second recommendation result and the adjusted first recommendation result; and determining the target recommendation result based on the first optimized recommendation result and the second optimized recommendation result.

20. The computer program product according to claim 15, wherein the content set is a set of candidate articles and the recommendation technique recommends a candidate article from the set of candidate articles based on a predetermined base article, and the method further comprises:
- determining a set of correlation measures associated with the set of candidate articles, each correlation measure in the set of correlation measures being indicative of a correlation degree between a corresponding candidate article and the base article; and
- adjusting the target recommendation result using the set of correlation measures, so as to update the target recommendation result.

* * * * *